(12) United States Patent
Pütt

(10) Patent No.: US 6,329,013 B1
(45) Date of Patent: Dec. 11, 2001

(54) METHOD FOR DISPENSING A VISCOUS SOLUTION

(75) Inventor: Ain Pütt, Strömstad (SE)

(73) Assignee: Scranex Automation AB, Stromstad (SE)

( * ) Notice: Subject to any disclaimer, the term of this patent is extended or adjusted under 35 U.S.C. 154(b) by 0 days.

(21) Appl. No.: 09/125,610

(22) Filed: Aug. 21, 1998

(30) Foreign Application Priority Data

Feb. 23, 1996 (SE) ..................................... 9600738

(51) Int. Cl.$^7$ ................................. B67D 5/08; B05D 1/02
(52) U.S. Cl. ................................. 427/8; 427/421; 222/1; 222/55; 222/58; 222/146.5
(58) Field of Search ........................ 427/8, 421; 118/696, 118/697, 300; 222/1, 41, 47, 52, 55, 58, 146.1, 146.2, 146.5

(56) References Cited

U.S. PATENT DOCUMENTS

| Re. 35,010 | * | 8/1995 | Price ........................................ 222/1 |
| 3,873,060 | * | 3/1975 | Espenchied et al. ................. 251/129 |
| 5,277,333 | * | 1/1994 | Shimano ................................. 222/14 |
| 5,556,471 | * | 9/1996 | Boccagno et al. .................... 118/300 |
| 5,571,248 | * | 11/1996 | Seetharaman et al. ......... 137/625.65 |
| 5,747,102 | * | 5/1998 | Smith et al. ............................. 427/96 |
| 5,871,123 | * | 2/1999 | Thomas ............................... 222/146.5 |
| 6,092,691 | * | 7/2000 | Schuerholz et al. ...................... 222/1 |

FOREIGN PATENT DOCUMENTS

WO 88/07713    10/1988  (WO) .

* cited by examiner

*Primary Examiner*—Shrive P. Beck
*Assistant Examiner*—Jennifer Calcagni
(74) *Attorney, Agent, or Firm*—Samuels, Gauthier & Stevens, LLP

(57) ABSTRACT

A method for substantially dynamic flow control when dispensing a substantially viscous material by means of a dosing system, including at least one dosing unit controlled by means of a computer unit, which dosing unit consists of at least one pressure part, a material container for containing the material to be applied, a nozzle and a pressure member displaceable in the material container. A test sequence is run before the dispensing operation and during the test sequence data is collected mainly about the dosing unit including the pressure within at least one pressure part, the position of the pressure member of the dosing unit, and a material feed pressure by the computer unit, a set value is determined for a material feed pressure and a material flow substantially with regard to the collected data and the material is dispensed with regard to the set value for flow controlled by means of a regulator, as a direct value of the set flow value and at the same time the application flow is controlled.

10 Claims, 4 Drawing Sheets

METHOD FOR DISPENSING A VISCOUS SOLUTION

TECHNICAL FIELD

The present invention refers to a method and a system essentially for dynamic flow control when dispensing a substantially viscous material by means of a dosing system, including at least one dosing unit controlled by means of a computer unit, which dosing unit consists of at least a pressure part and a material container for holding the material to be applied, a nozzle and a pressure member displaceable in the material container.

The invention also refers to a method for elimination of the dosage interrupt when dispensing a substantially viscous material by means of a dosing system.

BACKGROUND

Within the industry, preferably the automobile and domestic machine industry different types of sealing compounds and glue are used, which in floating form are applied onto at least one surface of the workpiece, which must be sealed or joined. The material that is used for usually sealing/gluing contains chemicals and substances, which are directly or indirectly unhealthy for the people through contact or inhalation. Generally, it is required that one uses protective clothing, which makes working difficult. In case of glue in solid form, it is needed that the glue melts and is applied in floating form, which requires that the dosing unit is equipped with heating element, which in turn requires heavier and bulkier apparatus. At sealing, it is very important that the sealing is done appropriate, without leaking parts.

The above work can be done manually, but recently use of robot systems for application and dosage of viscous material of above-mentioned types has begun in a great extent. In such systems, a dosing unit is arranged on a robot arm which moves over the workpiece to be furnished with the viscous material. The robot arm controlled by a computer moves in accordance with programmed instructions and dispenses, for example the glue or the sealing compound by applying strings of material on the contemplated areas.

The amount of the dispensed material, which should not be below or exceed a predetermined amount is also significant. This implies that one must measure and adjust the flow exactly through the dosing unit.

Dosing systems are commercially available where a doser is arranged on a robot arm. Nearby is arranged a docking/pump station, where that viscous material to be dispensed is kept. During the operation, the robot docks the doser in the docking station and fills it with the viscous material. The amount of the material varies in respect of the size of the dosing unit. Subsequently, the robot arm is moved over the workpiece and the material is applied on the same.

The materials applied/dispensed are usually very viscous and some requires frequent heating to be able to handle it at all. The normal value for viscosity is 50.000–500.000 cp. Examples of such material are all types of one component material such as silicon, epoxy, polyurethane, PVC, Butyls, all types of grease as well as different solvent based glues or the like.

Typical application temperatures are between +15° and +150° C., preferably 30°, 70°, 140° C., where a small temperature deviation results in a significant change of viscosity. Tests of certain material have shown that, for example 2° lower temperature results in 12% lower flow and 5° results in 26% lower flow.

The characteristics of the materials, for example thixotropy, can be changed depending on how the material is handled, e.g. if the material rests a long time in the dosing unit, it becomes more viscous.

When the material to be dispensed is very viscous, such as sealing compounds etc., measuring the flow with conventional flow meters is very difficult and there are very few flow meters which can do so. If the material is treated too much, for example in a gearwheel meter, it will be "grinded into pieces" and thereby show completely other characteristics. This is why it is desired to measure the material flow without contact with the material. Furthermore, the materials wear down the equipment significantly and it is difficult to clean the equipment, which results in frequent calibration and measurement error adjustment, which is done manually.

WO 88/07713 discloses a method and device, mountable on a robot arm, for dispensing material in floating form, which is dosed from a nozzle in an amount which is controlled by means of a measuring valve including a seat and a pin connected to a double-acting piston, which can be moved relative the seat and modulate material flow. A servo actuator connected to a feedback, controls and positions the piston and the pin relative the seat with a control signal, generated with regard to the difference between an operation signal which presents the set flow and the sum of a pair of feedback signals, one of which shows the actual flow amount while the other corresponds to both the relative speed and position of the pin in respect of the seat.

The device uses a so-called position dependent movement feedback and the principle is based on flow limiting with variable area, where the relationship between the adjustment sensitivity increases with increasing area between the valve pin and the seat. The increasing area is obtained by adjusting with small distances between the pin and the seat and in this way obtaining large variables in the flow area. Further, the positions of the double-acting piston and the pin are fed back to a control circuit by means of an electromagnetic inductance circuit. A flow sensor is located at the nozzle which generates a first flow signal, as the first feedback signal to the control system. The first feedback signal is generated by a measured signal based on the pressure drop over the nozzle. Another position dependent feed back signal is generated in respect of the position of the pin and feedback to the control system. The first and second signals form a connection based on the flow-pin opening. The function of the system is based on a certain material with a certain viscosity, whereby a certain distance between the valve pin and the valve seat generates a certain flow and a certain pressure drop over the nozzle of the valve. A problem with this system is that most of the materials which should be dispensed contain filling materials, which wear down and influence the parts that are in the flow path, for example the valve seat. Since the principle of the adjustment in a higher degree depends on the relationship between the seat, pin and the opening gap, a little wear will result in a major flow error. Consequently, the reliability of the system is highly related to the degree of filling material in the material to be dispensed. Furthermore, no discussions are made on the relationship between the actual and set value and how reliable a primary flow as basis for continuous adjustment is obtained. The system does not manage dynamic handling of variations in the flow, for example, because the viscosity of the dispensed material can change as a result of temperature differences or presence of air. Neither the system can handle a continuous flow value during the entire application cycle nor provide the total applied amount of the material during a cycle.

BRIEF DESCRIPTION OF THE INVENTION

The object of the present invention is to provide a dosing system which is free from above-mentioned drawbacks.

Another object of the invention is to provide a flow control system with an "off-line" measuring system and minimum response time from the doser to the adjusted flow. The system should also comply with the preciseness for the flow control, i.e. inaccuracy <±1.5% and a response time of about 0.1 between the maximum and minimum flow.

Furthermore, the system will reduce the pressure drop in the feed hoses and pipe line systems.

Yet an object of the system, according to the present invention is to reduce the number of included components to obtain a dependable and cost-effective construction. Furthermore, the system will be fast and include few, specially movable parts.

A main object of the system, according to the present invention is that it will be reliable, thanks to that the system will be able to detect feed interruption when dispensing the viscous material Moreover, the system will be made of parts existing on the market, which reduces the cost of production.

Yet an object is to measure output flow during the entire application cycle as well as the total applied amount of dispensed material.

Moreover, the flow measurement for flow control is carried out remotely and with a quick response time.

Furthermore, all system settings will be settled from an operator terminal, with so simple operation as possible, thus service/maintenance personal can quickly install and start the operation of the system.

Above-mentioned objects and advantages, and other advantages will be obvious through reading the following description.

The objects have been obtained through a method by collecting data, substantially about the dosing unit from the computer unit in a first stage, determination of a set value for a material feed pressure and a material flow substantially in respect of collected data, application of the material with regard to the set value for flow controlled by means of a regulator as a direct value of the set flow value, and at the same time controlling that dispensed flow. Also, by a system where the dosing unit has a substantially known volume, and the computer unit with regard to the volume of the dosing unit and a signal received from a sensor, representing the output flow, regulates the pressure with the pressure member.

BRIEF DESCRIPTION OF THE DRAWINGS

In the following, the invention will be described with reference to enclosed drawings showing embodiments, where.

DESCRIPTION OF THE EMBODIMENTS

Figure 1:
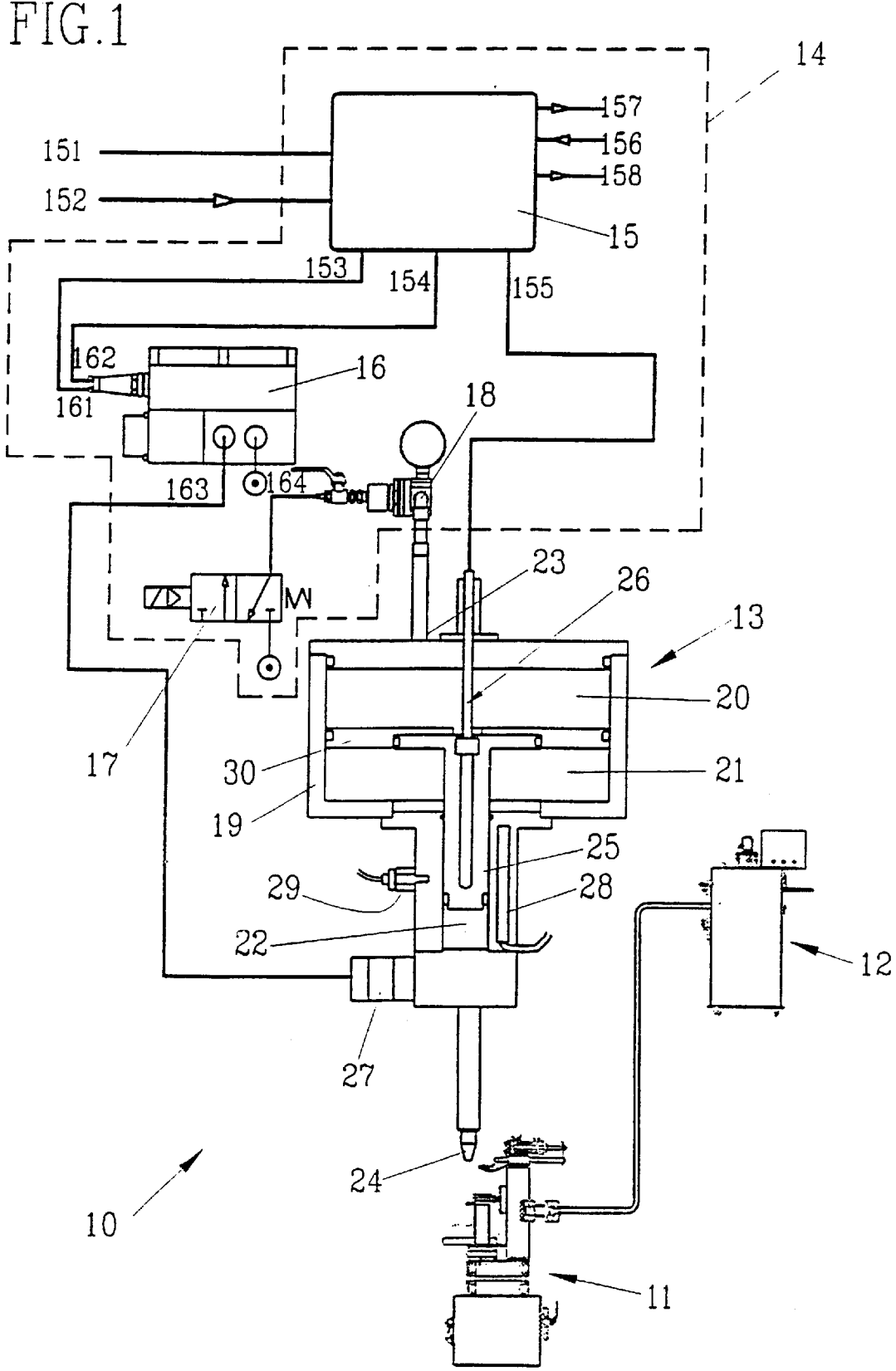
FIG. 1 shows schematically an embodiment of a system, according to the present invention for dispensing/dosage of a viscous material.

FIG. 1 shows schematically a first embodiment of a preferred dosing system 10, according to the invention. The system substantially includes at least one docking station 1, a pump station 12 and a dosing unit 13 and a control arrangement 14 (marked with dashed line) and a robot (not shown).

The dosing unit 13 consists of a hollow housing 19, substantially including a first and a second variable chamber 20 and 21, respectively, and a material container 22. The housing is also provided with an inlet/outlet 23 for a pressure media, such as compressed air and a combined inlet/outlet 24, via a nozzle for charge and dosage of material. Inside the dosing unit 13, in the material container 22 an axially displaceable piston 25 is arranged. The piston 25 cooperates with a sensor 26, preferably a liner potentiometer or a linear pulse transducer of known type functioning as a position indicator for the piston 25. At one end of the material container 22, at least one material pressure regulator 27 is arranged. According to this embodiment, also, a heating element 28 and a sensor 29 of known types are arranged in the housing of the material container 22.

The control arrangement 14 includes means for controlling and regulating the flow from the dosing unit 13, and according to this embodiment comprises at least a microprocessor-based control unit 15, a regulator 16 and valves 17 and 18, respectively.

The control unit 15 in the control arrangement 14, which consists of a conventional PLC, is arranged with a number of inputs and outputs, for collecting data as well as for generation and transmitting control signals. The control unit 15 can further include a number of memory units for storing data and instructions. The control unit 15 may be controlled by the robot or another external control unit. According to this embodiment, the input 151 is connected to a set value indicator (not shown), via input 152, the control unit is controlled from the robot, output 153 is connected to the regulator 16 and transmits control signals to it, input 154 is a P/I feedback coupling from the regulator 16, the input 155 is connected to the potentiometer 26 through which the value of the potentiometer is read, input 156 is connected to the temperature indicator 29 for reading its value and the output 157 is connected to the heating element 28 for controlling the same.

The regulator 16 preferably consists of a conventional electromagnetic proportional regulator having a short response time (<30 milliseconds), connected via an analogous or digital set value input 161 to the control unit, via the output 162, an analogous or digital value is sent to the control unit 15, so-called P/I feedback, as a receipt to the set value; via output 163 the regulator 27 is controlled and via input 164 so-called P-air is connected. The regulator 27 is preferably a material pressure regulator with a mounted air servo. The material pressure regulator is used to regulate the material flow and can operate in a wide pressure range, for example from 1 up to 300 bar. The regulator is provided with variable spring assembly so that it can be adapted to different adjustment ranges. The material pressure regulator 27 compensates for variations in the characteristics of the material, and where it does not reign, the control unit 15 and the regulator 16 also regulates/compensates. The valve 17 is controlled directly from the control unit, output 158, and can supply the dosing unit with a constant compressed air.

When filling the dosing unit 13, the pump system 12 supplies the docking station 11 with material (hot or cold), which afterwards is docked with the robot carried dosing unit 13. The dosing unit 13 is filled through the nozzle 24 and further through the material pressure regulator 27 which in the filling sequence is held in an open position by the analogously or digitally controlled servo pneumatic proportional pressure regulator 16.

The dosing unit is filled with regard to a feedback coupled "off-line value", at the same time that the air section 20 is de-aired through the valve 17 and the value over the analogous linear potentiometer 26 is read, which gives an absolute "actual value", for example, in form of 0–10 V. The potentiometer 26 which substantially is located in the compressed air chamber 20 of the dosage unit cooperative with the piston 25, supplies the potential changes due to the movement of the piston. When the material container 22 is filled up to, for example 95%, the filling sequence is stopped. During the filling sequence the chamber 20 is de-aired. The coefficient of fullness 95% is a relative value and generally depends on the degree of the expansion of the material. The coefficient of fullness is carried out to obtain a pressure compensating, which prevents after drip and results in that the accuracy of the measurement regarding the volume is ensured.

After filling, the regulator 27 is closed, which in this position also functions as a stop valve.

The dosing unit 13 is then pressurized afterwards with a fixed pressure suitable for a test sequence. By reading the linear potentiometer 26 when the filling is finished, and pressurizing the dosing unit with closed regulator 27 a material compression is obtained.

To eliminate the dosage interrupt that can arise because of air in the material a test is carried out first. The dosing unit 13 is tested with an air free material and the value from the potentiometer 26 is registered. Then air in material can be detected before the dispensing is initiated and appropriate alarm can be given to the robot. The robot can then go to a position and signal to empty the material in an appropriate container.

This technique gives appreciable advantages with respect to the conventional methods which dispenses the material and subsequently with additional technique tries to test for an interrupt in the applied material string.

When dispensing, the set flow signal is received which is given from the robot in the control unit 15, as an analogous (0–10 volt) or a digital value. The control unit 15 converts the signal to an analogous value by means of a conversion factor, which depends on the size of the set flow. The conversion factor is obtained when the current material is fed out with fixed pressure values to the air pressure regulated servo regulator 16, subsequently the outputted volume is measured in respect of a fixed time constant.

The process is re-run with an increased pressure over the regulator etc.

Figure 2:
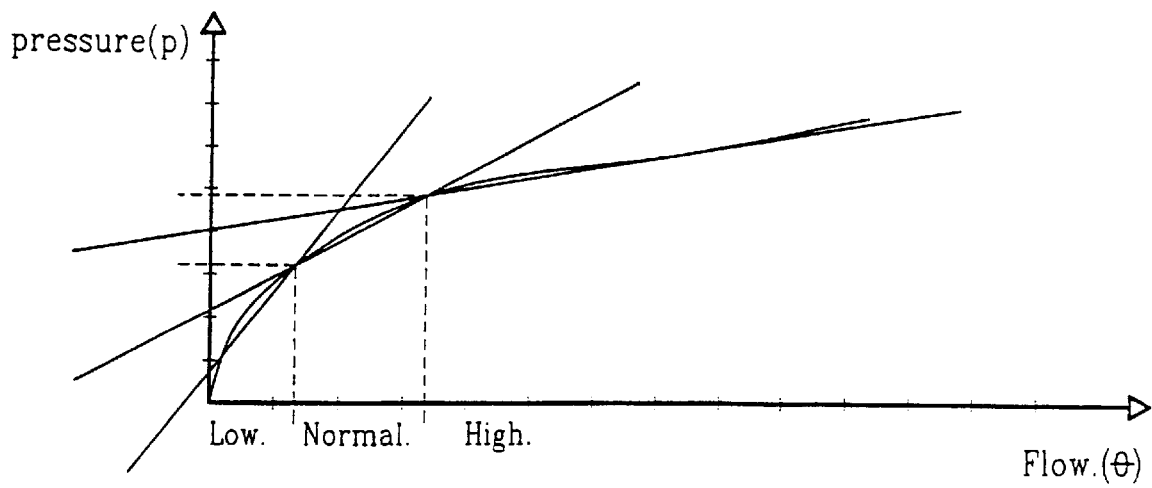
FIG. 2 shows an example of a pressure-flow diagram, generated when dispensing a viscous material by means of a dosing wit, according to the present invention.

Depending on the thixotropy of the material, a "catchup effect" may be resulted, trying to get the material out of the dosing unit. Therefore a pressure/flow diagram is provided for the specific material and there is approximated at least 3 linear sections, one for each low, normal and high flow, respectively, according to FIG. 2. Subsequently, as a set flow is determined, an input pressure and amplification is selected with regard to the diagram, which enables a more correct initial pressure even from the beginning and from there a PID regulation begins. In this case an appropriate pressure variation can be 1, 2, 3, . . . bar. This process and a pressure/flow characteristic obtained through tests are generated automatically in the control system, for example during setup/test menu through a control board for the operator. Conversion factors for low, normal and high flow constants recalculate the set flow signal 151 from the robot to a suitable value for selected analogous proportional valve 16. Then the PI converter of the proportional regulator 16 confirms that the pressure coincides with the factor chosen by the control system.

The dispensing is initiated as a direct value of the set flow signal 151, either as a fixed value or as a value directly proportional to the speed of the robot, so-called "TCP value".

When the dispensing is started, also a constant sampling of that output flow is initiated. The processing unit (processor) of the control unit 15 can sample via an A/D/A module (Analogous/Digital/Analogous module) the changes continuously on the feedback value 155 from the linear potentiometer 26. Differences in dispensing speed with regard to the received set value are detected by the processor, which by means of built-in regulators, so-called PID regulator adjusts the control signal 153 to the proportional regulator 16, with a pressure air value of for example 0–6 bar.

By means of a preferably very quick proportional regulator and a quick sampling equipment, a reliable and vigorous regulator equipment is obtained which does not have any measuring system directly affecting the material flow with the drawbacks such as wearing thanks to filler, coking or the like.

The system can also be arranged with visual or audible alarm.

Figure 3:
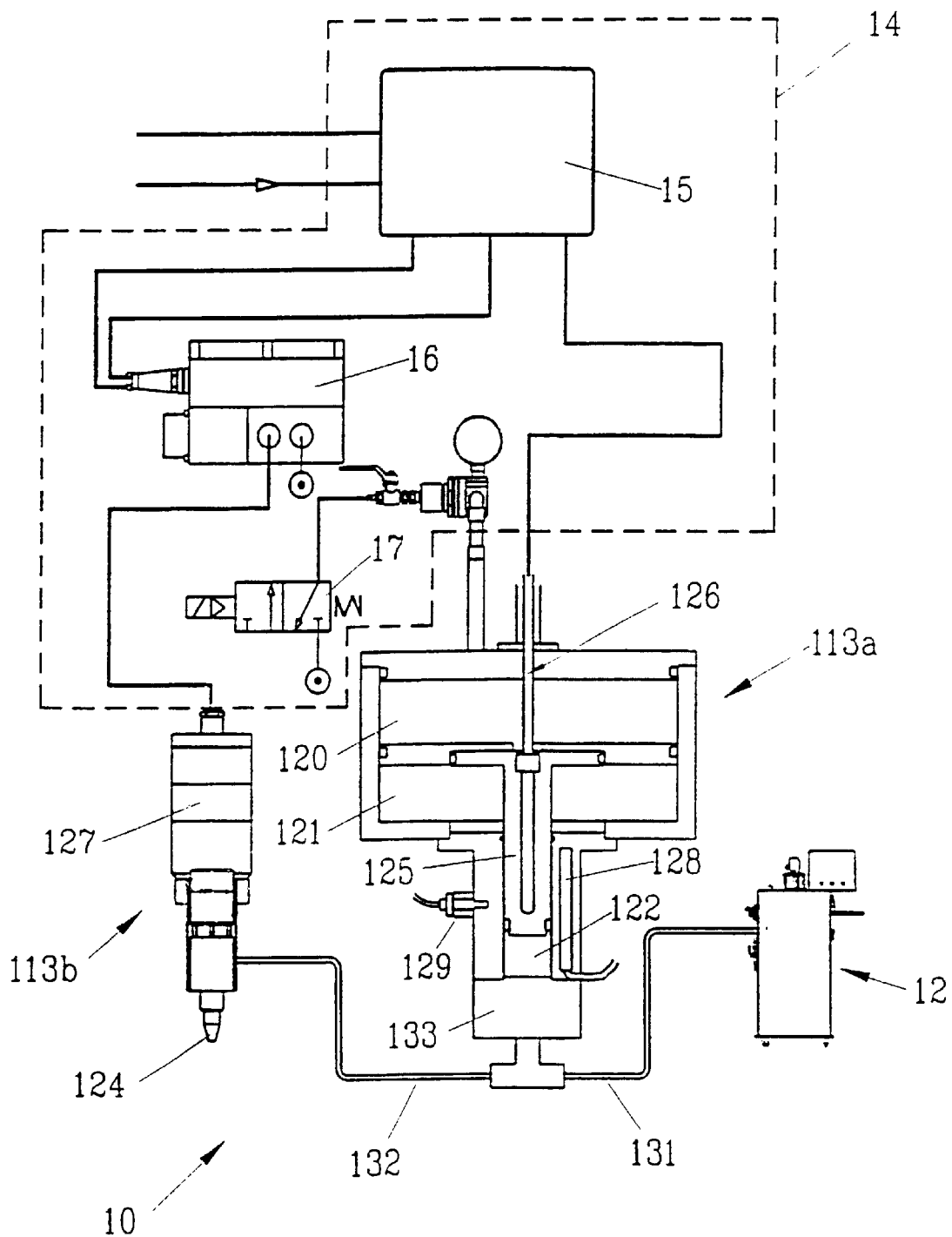
FIG. 3 shows another schematic embodiment of a dosing unit in a dosing system, according to invention.

FIG. 3 shows an embodiment of the system, according to the invention, where the dosing unit substantially differs from that in FIG. 1 embodiment in that the dosing unit 113 is divided in two parts 113a and 113b. Both parts or only one of them, preferably part 113b, can be mounted on the robot arm. The dosing unit 113a essentially includes same parts as the dosing unit 13, according to FIG. 1, i.e. the material container 122, the piston 125, the potentiometer 126, possible heating element 128 and sensor 129. The other part of the dosing unit 113b includes the nozzle 124 and the material pressure regulator 127. The material to be dispensed is supplied into the material container 122 from pump 12 via the pipe 131 and via a filling valve in the valve part 133 at the inlet to the material container 122. After filling, the pressure part 113a is pressurized with a constant pressure. When dispensing the material is fed via conduit 132 to the unit 113b, where the flow is regulated by means of the material pressure regulator 127, which in turn is controlled by the pressure air from the proportional valve 116. The adjustment and dosage are carried out analogous to the description of the first embodiment. The conduit 132 should be rigid or have large flow area to compensate for a possible pressure drop.

Figure 4:
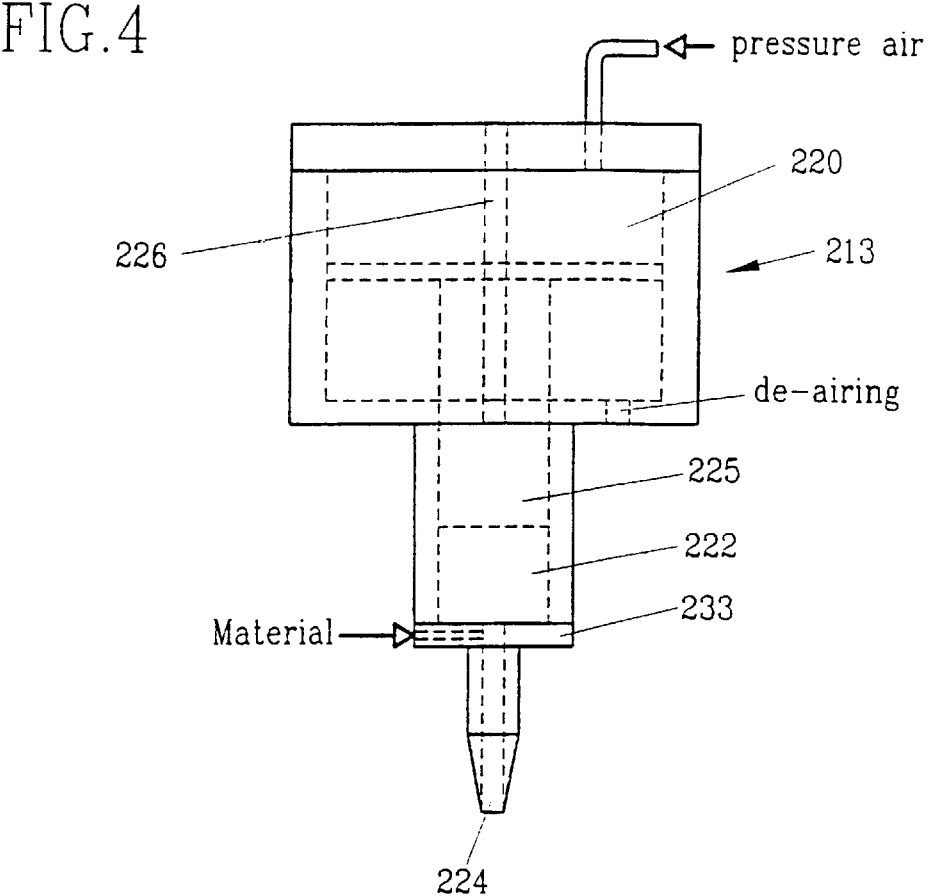
FIG. 4 illustrates schematically yet another embodiment of a dosing unit.

The embodiment of the dosing unit 213 shown in FIG. 4 does not include the material pressure regulator according to the former embodiments. When filling the dosing unit 213, the material container 222 is filled through a filling valve arranged in the valve part 233 and the air chamber is 220 de-aired at the same time by means of the proportional valve. At the doser, the flow through the nozzle 224 and thereby the movement of the piston 225 is regulated by means of the pressure air via the proportional valve, at the same time as a valve, preferably a drain valve, is opened in the valve unit 233.

When using a material that must be warmed up the temperature adjustment is another important factor in the system, as the characteristics of the material strongly dependents on the temperature. Therefore, the inaccuracy regarding the temperature is kept to a maximum, for example ±1,5%.

All systems, also those for cold material can preferably have temperature regulation, at least in the conduits and the dosing unit, to avoid flow error depending on the varying ambient temperature. The warm systems can have one or more coolant circuits, which can be controlled over the transistor outputs and semiconductor relays in the control unit.

Figure 5:
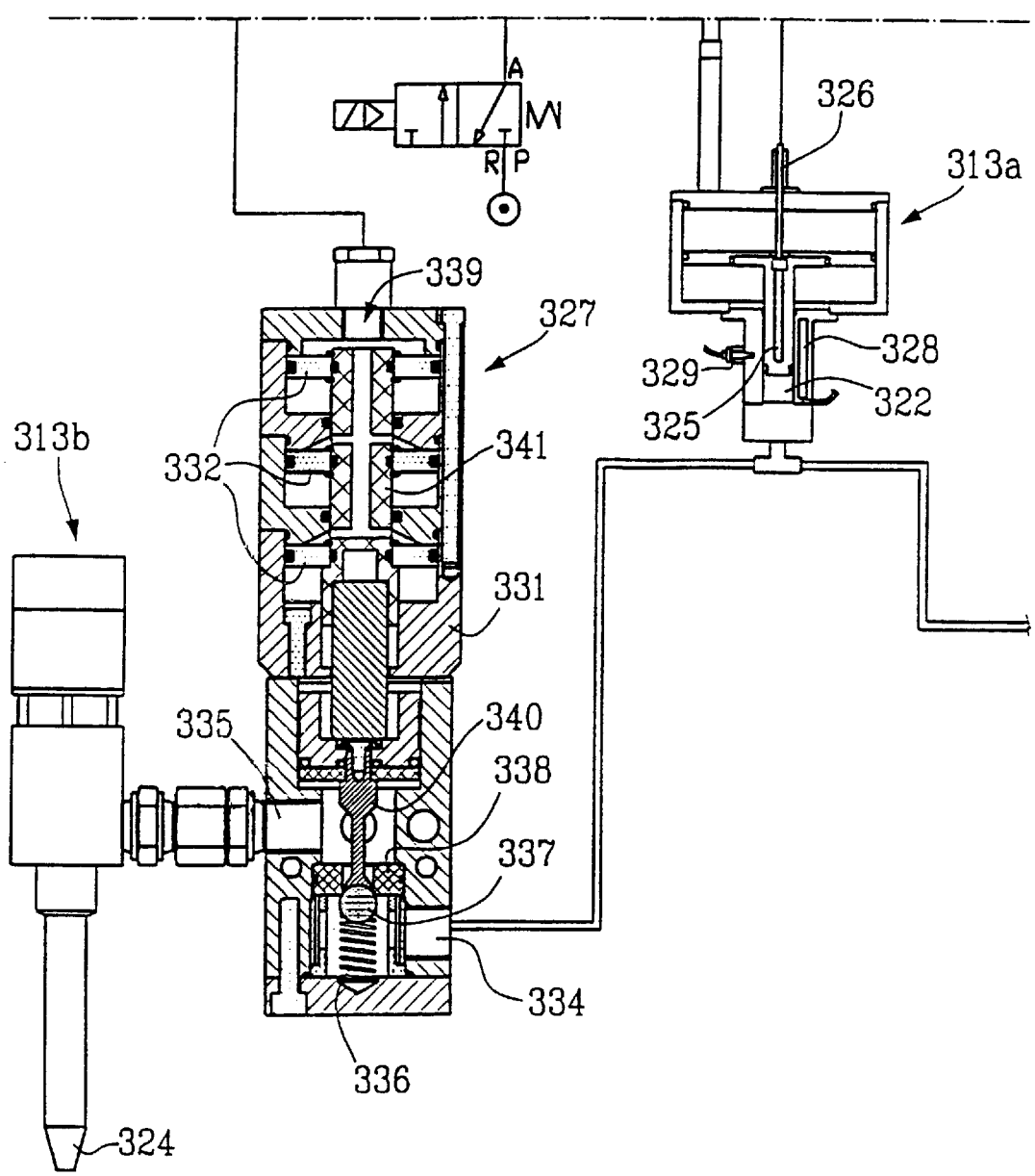
FIG. 5 shows an embodiment of a dosing unit connected to a material pressure regulator.

FIG. 5 shows a preferred system where the material application regulator 327 is arranged between the dosing unit 313a and 313b. The dosing unit 313a includes essentially same parts as the dosing unit 213, according to FIG. 3, i.e. the material container 322, piston 325, sensor 326, possible heating element 328 and sensor 329. The other part of the dosing unit 313b includes the nozzle 124.

The material pressure regulator 327 substantially includes a housing 331, accommodating pistons 332, inlet 334, outlet 335, spring 336, ball 337, seat 338, pressurizing inlet 339 and ball holder 340. The material is supplied through the inlet 334 and the material pressure presses the ball 337, preferably a hard steel ball, towards the seat 338. If the material pressure is zero (no flow) the ball is positioned on the seat 338 by means of the coil spring 336. When a certain flow is wanted, a control pressure is applied on the air servo section of the flow regulator. A control pin 341, is arranged in the center hole of the three pistons, whereby the control pressure presses the pistons 332 and thereby the control pin and via the ball holder the steel ball 337 away from the seat 338. Thereby the flow becomes proportionated by the relationship between the fed material pressure and the control pressure from the air-servo.

The reason that in this cases three coupled pistons are used, is for considerations of space, since a piston should require a substantially larger area to be able to counteract the pressure on the ball, which is represented by the dispensed material.

The pressure of the dispensed material should at least be double with regard to the pressure that is taken out on the secondary side to ensure material flow to the regulator.

The air servo can also be replaced with a spring set, whereby the wanted pressure in the secondary side is regulated by straining the spring set different hard and thereby obtaining a pressure value that corresponds to the wanted flow. Obviously, the material pressure does not need to be constant When starting the system, all settings are sat from an operator terminal, through which following information can be inputted, for example:

type of dosing unit,
the volume of the dosing unit (exact),
operating range (normal flow),
application temperature,
energy saving function ON/OFF, and so on.

Subsequently, the value of the empty dosing unit is annotated by driving the piston in bottom, transferring the potentiometer value to the register and performing the same operation for full dosing unit.

Then an automatic adjustment can be started, whereby the dosing unit is filled up and the material is fed out with different pressures and the resulting flow is registered in different registers, in this way the pressure/flow characteristic of the material is obtained automatically.

At normal operation, the set flow is indicated from the operator terminal or as an external signal detection from the robot control system. The flow is regulated and monitored continuously. Deviations exceeding the tolerances which cannot be regulated automatically generate alarm.

After that the dosing unit has been filled, it is pressurized so that the material is compressed, the potentiometer is read to detect air in the material, and if it is the case alarm is generated. Deviations can be stored in a priority table with flow control as most prioritised. Also, the heat adjustment error can be stored in the priority table with lesser priority. As the volume of the dosing unit is known, the system can trace the consumption of the material and generate alarm if the material, which is fed from a reservoir via the pump to the docking station decreases below a certain amount.

The system according to the present invention is primarily intended for use for sealing, gluing, cementing, infusing, filling, floating gaskets, point dosage and lubrication. The system can also be used for works within obvious areas, such as measurement and dosage of components for chemicals compounds, paints or the like.

While we have illustrated and disclosed preferred embodiments of the invention, it is obvious that more variations and modifications within the scope of the attached claims can occur. For instance the potentiometer can be arranged externally. Pressure medium can be replaced with some appropriate servo fluid or oil or the like.

| REFERENCE SIGNS | | |
|---|---|---|
| 10 | system | |
| 11 | docking station | |
| 12 | pump | |
| 13 | dosing unit | 113, 213, 313 |
| 14 | control arrangement | |
| 15 | control unit | |
| 16 | regulator | |
| 17 | valve | |
| 18 | valve | |
| 19 | housing | 119, 219 |
| 20 | air chamber | 120, 220 |
| 21 | housing | |
| 22 | material container | 122, 222, 322 |
| 23 | air inlet/outlet | |
| 24 | outlet/inlet | |
| 25 | piston | 125, 225, 325 |
| 26 | level indicator | 126, 226, 326 |
| 27 | material pressure regulator | 127, 227, 327 |
| 28 | heating element | 128, 328 |
| 29 | sensor | 129, 329 |
| 30 | piston base | |
| 131 | conduit | |
| 132 | conduit | |
| 133 | valve section | 233 |
| 151 | input for set value | |
| 152 | control input | |
| 153 | output to regulator | |
| 154 | P/I feedback | |
| 155 | input from potentiometer | |
| 156 | input from sensor | |
| 157 | output to heating element | |
| 158 | output to valve | |
| 161 | P/I feedback coupling | |
| 162 | set value | |
| 163 | output | |
| 164 | air | |
| 331 | housing | |
| 332 | piston | |
| 334 | inlet | |
| 335 | outlet | |
| 336 | spring | |
| 337 | ball | |
| 338 | seat | |
| 339 | pressurizing inlet | |
| 340 | ball holder | |
| 341 | control hole | |

What is claimed is:

1. A method for substantially dynamic flow control when dispensing a substantially viscous material by means of a dosing system, comprising at least one dosing unit controlled from a computer unit, which dosing unit consists of at least one pressure chamber, a material container, for containing the material to be applied, a nozzle, a pressure member displaceable in the material container the method comprising:

running a test sequence before dispensing operation, and during said test sequence:

collecting data, mainly about the dosing unit including the pressure within at least one pressure part, the position of the pressure member of the dosing unit, and a material feed pressure by the computer unit;

determining a set value for a material feed pressure and a material flow substantially with regard to the collected data including the pressure within the dosing unit;

dispensing the material with regard to set value for the flow controlled by means of a regulator as a direct value of the set flow value; and at the same time controlling the dispensed material flow.

2. The method according to claim 1, wherein, the dosing unit includes at least one inlet and/or outlet for a pressure generating substance.

3. The method according to claim 1, wherein, the dosing unit is tested to obtain and store said data.

4. The method according to claim 1, wherein, the data collected in first step includes size of the material container and pressure of an empty and filled container.

5. The method according to claim 1, wherein the material is filled in the container by docking the dosing unit to a filling station.

6. The method according to claim 1, wherein, the material is filled into the container via a conduit connected to the container.

7. The method according to claim 1, wherein, the computer unit controls and regulates a heating element provided in the dosing unit.

8. The method according to claim 1, wherein, the set flow value is a fixed value.

9. The method according to claim 1, wherein, the set flow value is a value proportional to the movement of the dosing unit relative the workpiece.

10. A method of elimination the dosage interrupt when dispensing a substantially viscous material by means of a dosing system, including at least one dosing unit controlled by means of a computer unit, which dosing unit consists of at least one pressure part, a material container for containing the material to be applied, a nozzle and a pressure member displaceable in the material container and cooperative with a sensor, comprising:

performing a test, where the dosing unit is tested with a non interruptive material and registering the value of the sensor and subsequently detecting interruption in the material when a later continuously collected flow degree differs from a registered output value.

* * * * *